(12) United States Patent
Sato et al.

(10) Patent No.: US 12,531,243 B2
(45) Date of Patent: Jan. 20, 2026

(54) ELECTRODE ACTIVE MATERIAL, ELECTRODE, AND SECONDARY BATTERY

(71) Applicant: THE UNIVERSITY OF TOKYO, Tokyo (JP)

(72) Inventors: Masaharu Sato, Tokyo (JP); Hiroshi Nishihara, Tokyo (JP); Ying Wang, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 558 days.

(21) Appl. No.: 17/912,801

(22) PCT Filed: Mar. 15, 2021

(86) PCT No.: PCT/JP2021/010367
§ 371 (c)(1),
(2) Date: Sep. 19, 2022

(87) PCT Pub. No.: WO2021/187417
PCT Pub. Date: Sep. 23, 2021

(65) Prior Publication Data
US 2023/0178735 A1 Jun. 8, 2023

(30) Foreign Application Priority Data
Mar. 17, 2020 (JP) .................................. 2020-046493

(51) Int. Cl.
*H01M 4/60* (2006.01)
*C07D 285/15* (2006.01)
(Continued)

(52) U.S. Cl.
CPC ............ *H01M 4/60* (2013.01); *C07D 285/15* (2013.01); *H01M 4/625* (2013.01); *H01M 10/0569* (2013.01); *H01M 2300/0028* (2013.01)

(58) Field of Classification Search
CPC ....................................................... H01M 4/60
See application file for complete search history.

(56) References Cited

U.S. PATENT DOCUMENTS

| 4,535,039 A | * | 8/1985 | Naarmann | H01M 10/36 |
| | | | | 429/324 |
| 4,832,869 A | * | 5/1989 | Cotts | H01M 4/60 |
| | | | | 524/404 |

(Continued)

FOREIGN PATENT DOCUMENTS

| JP | 2001-266884 A | 9/2001 |
| JP | 2002-151084 A | 5/2002 |

(Continued)

OTHER PUBLICATIONS

May 18, 2021 International Search Report issued in International Patent Application No. PCT/JP2021/010367.

(Continued)

*Primary Examiner* — Barbara L Gilliam
*Assistant Examiner* — Jade Serena Simmons
(74) *Attorney, Agent, or Firm* — Oliff PLC

(57) ABSTRACT

An electrode active material has a high energy density, high output, and a superior cycle property with little decrease in capacity even after repeated charge and discharge. An electrode and a secondary battery can include the electrode active material. An electrode active material which contains a compound having a dithiadiazine group, and is used as an active material of a secondary battery that repeats charge and discharge by a battery electrode reaction, and electrode containing the electrode active material and a conductive material. In addition, a secondary battery wherein the electrode active material is contained in any one of a reaction starting material, a product, and an intermediate product of at least a discharge reaction of the battery electrode reaction.

7 Claims, 1 Drawing Sheet

(51) Int. Cl.
*H01M 4/62* (2006.01)
*H01M 10/0569* (2010.01)

(56) References Cited

U.S. PATENT DOCUMENTS

| | | | |
|---|---|---|---|
| 4,833,048 A | | 5/1989 | Dejonghe et al. |
| 2003/0096165 A1 | | 5/2003 | Nakahara et al. |
| 2009/0094822 A1 | | 4/2009 | Ohtsuka et al. |
| 2010/0047688 A1 | * | 2/2010 | Ohtsuka ............ C07C 50/16 552/292 |
| 2011/0020700 A1 | * | 1/2011 | Iwaya ............ H01M 10/0567 429/200 |
| 2021/0028485 A1 | | 1/2021 | Inoue et al. |

FOREIGN PATENT DOCUMENTS

| | | | | |
|---|---|---|---|---|
| JP | 2004-207249 A | | 7/2004 | |
| JP | 2008-147015 A | | 6/2008 | |
| JP | 2008-222559 A | | 9/2008 | |
| JP | 2011-124017 A | | 6/2011 | |
| JP | 2012-133918 A | | 7/2012 | |
| JP | 2015-165481 A | | 9/2015 | |
| KR | 20180070495 A | | 6/2018 | |
| KR | 102013530 B1 | | 8/2019 | |
| KR | 2047256 B1 | * | 11/2019 | ............ C01G 53/50 |
| WO | 2007/116926 A1 | | 10/2007 | |
| WO | 2013/172323 A1 | | 11/2013 | |
| WO | 2019/182013 A1 | | 9/2019 | |

OTHER PUBLICATIONS

May 18, 2021 Written Opinion of the International Searching Authority issued in International Patent Application No. PCT/JP2021/010367.

* cited by examiner

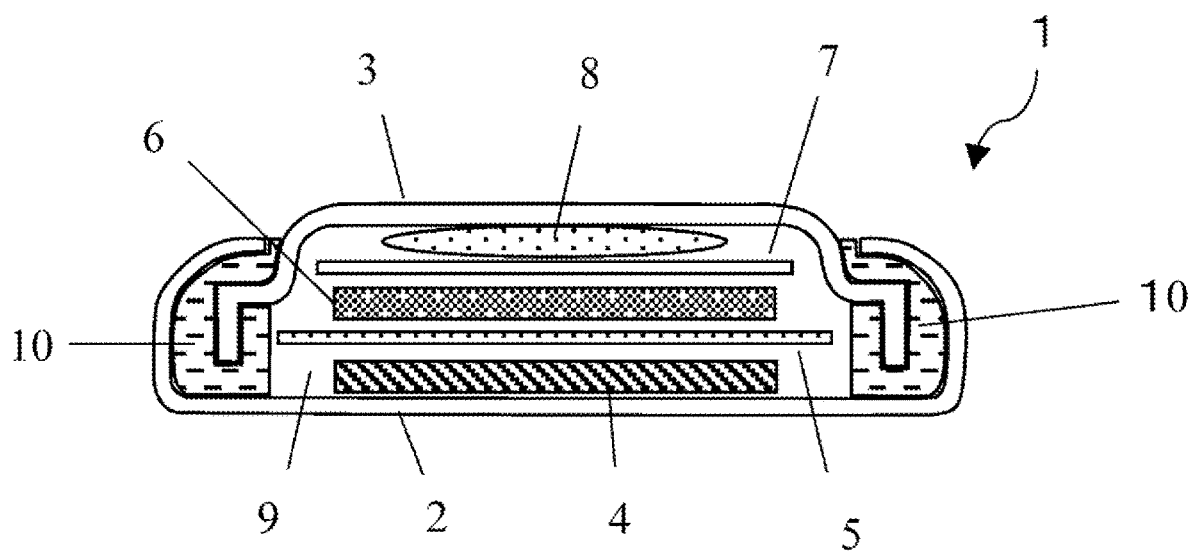

ELECTRODE ACTIVE MATERIAL, ELECTRODE, AND SECONDARY BATTERY

TECHNICAL FIELD

The present disclosure relates to an electrode active material, an electrode, and a secondary battery, and in more detail, relates to an electrode active material which repeats charges and discharges using a battery electrode rection, and an electrode and a secondary battery using the electrode active material.

BACKGROUND ART

As the expansion of the market for mobile electronic devices, such as mobile phones, notebook computers, digital cameras, etc., as a cordless power source for such electronic devices, a long-life secondary battery having a large energy density and a high output power has been eagerly desired.

In order to meet such requirements, a secondary battery using an alkali metal ion such as lithium ion, etc., as a charge carrier, and utilizing the electrochemical reaction with charge giving/receiving, has been developed. In particular, a lithium-ion secondary battery has a high energy density, and has been also widely used as an on-board battery.

Among the constituting elements of a secondary battery, an electrode active material is a material which directly contributes to a battery electrode reaction, i.e., charge reactions and discharge reactions, and has a central role in the secondary battery. Namely, the battery electrode reaction occurs by applying a voltage to an electrode active material which constitutes an electrode arranged in an electrolyte, along with giving/receiving of electrons, and progresses when charging/discharging the battery. Accordingly, as mentioned above, systematically, the electrode active material has a central role in the secondary battery.

Then, in the above-mentioned lithium-ion secondary battery, a lithium-containing transition metal oxide is used as a positive-electrode active material, and a carbon material is used as a negative-electrode active material. Using the insertion reaction and the elimination reaction of lithium ions to and from these electrode active materials are utilized for performing charging/discharging.

However, the lithium-containing transition metal compound contains a transition metal as a constituting element, and thus, has a large molecular weight, leading to drawbacks that the energy density per mass of the electrode active material does not increase. Further, there are drawbacks that the amount of resources for the transition metal is limited.

In order to overcome these drawbacks, a secondary battery using an organic compound for which resources are abundant, for example, using an organic radical compound, an organic sulfur compound, and a quinone compound, as an electrode active material, has been actively studied and developed.

Patent Document 1 is known as a prior art which discloses an organic radical compound used as an electrode active material.

Patent Document 1 discloses an active material for a secondary battery using a nitroxyl radical compound, an oxy radical compound, and a nitrogen radical compound having a radical on a nitrogen atom.

In an organic radical compound, an unpaired electron to be reacted is localized on a radical atom, and thus, the density of the reacting part can be increased. Therefore, it is expected that a high-capacity secondary battery can be realized. Patent Document 1 describes an example in which a nitroxyl radical having a superior stability is used as a radical. For example, a secondary battery having an electrode layer containing a nitronyl-nitroxide compound as a positive electrode, and a copper foil adhered to lithium as a negative electrode, is produced, and repeatedly charged/discharged, resulting in confirmation that 10 or more cycles of charging/discharging are possible.

Further, Patent Document 2 and Patent Document 3 are known as prior arts in which an organic sulfur compound is used as an electrode active material.

Patent Document 2 discloses a novel metal-sulfur type battery cell in which an organic sulfur compound, i.e., a positive electrode material, has a S—S bond when the positive electrode is charged, and the S—S bond is cleaved when the positive electrode is discharged to form an organic sulfur metal salt having a metal ion.

In Patent Document 2, a disulfide-based organic compound represented by General Formula (10) (hereinafter, referred to as "disulfide compound") is used as an organic sulfur compound.

R—S—S—R  (10)

[Here, R represents an aliphatic organic group or an aromatic organic group, each R may be the same or different.]

The disulfide compound can perform a two-electron reaction. Under a reduced state (discharged state), the S—S bond is cleaved, and thereby, an organic thiolate (R—S—) is formed. Then, the organic thiolate forms a S—S bond under an oxidized state (charged state), to restore a disulfide compound represented by General Formula (10). Namely, the disulfide compound forms a S—S bond having a small bond energy, and thus, a reversible oxidation/reduction reaction occurs using the bond and the cleavage by the reaction, and thereby, charging/discharging can be performed.

Patent Document 3 discloses an electrode for a battery which contains a rubeanic acid or a rubeanic acid polymer having a structural unit represented by General Formula (11), and capable of bonding with a lithium ion.

(NH—CS—CS—NH)—  (11)

The rubeanic acid of the rubeanic acid polymer having a dithionic structure represented by General Formula (11) is capable of bonding with a lithium ion at the time of reduction, and is capable of releasing the bonded lithium ion at the time of oxidation. Using the reversible oxidation/reduction reaction of the rubeanic acid or the rubeanic acid polymer as above, charging/discharging can be performed.

In Patent Document 3, when the rubeanic acid is used for the positive-electrode active material, a two-electron reaction is possible, and a secondary battery having an energy density of 400 Ah/kg at a normal temperature, can be obtained.

Further, Patent Document 4 is known as a prior art in which a quinone compound is used as an electrode active material.

Patent Document 4 discloses an electrode active material containing a specific phenanthrenequinone compound having two quinone groups located at ortho position.

The specific phenanthrenequinone compound disclosed in Patent Document 4 generates a two-electron reaction, which is peculiar to a quinone compound, with the lithium ion, and thus, a reversible oxidation/reduction reaction can be performed. Further, when the specific phenanthrenequinone compound is oligomerized or polymerized, insolubility to an organic solvent can be achieved without decreasing the number of reacting electrons by electron repulsion. Patent Document 4 discloses that a phenanthrenequinone dimer shows two oxidation/reduction voltages (around 2.9 V and around 2.5 V), and the initial discharge capacity reaches 200 Ah/kg.

PRIOR ARTS

Patent Document

Patent Document 1: Japanese Unexamined Patent Publication (Kokai) No. 2004-207249
Patent Document 2: U.S. Pat. No. 4,833,048
Patent Document 3: Japanese Unexamined Patent Publication (Kokai) No. 2008-147015
Patent Document 4: Japanese Unexamined Patent Publication (Kokai) No. 2008-222559

SUMMARY

However, in Patent Document 1, although the organic radical compound such as a nitroxyl radical compound, etc., is used as an electrode active material, the charge/discharge reaction is limited to a one-electron reaction involving only one electron. Namely, in case of an organic radical compound, when a multi-electron reaction involving two or more electrons occurs, the radical becomes unstable to be decomposed, etc., and the radical disappears, resulting in losing reversibility of the charge/discharge reaction. Accordingly, when an organic radical compound is used, as disclosed in Patent Document 1, the reaction should be limited to the one-electron reaction, and performing a multi-electron reaction by which high-capacity can be expected, is difficult.

In Patent Document 2, a low-molecular disulfide compound involving two electrons is used. However, along with the charge/discharge reaction, bonding to/cleaving from another molecule is repeated, and thus, the reaction is unstable. Therefore, when the charge/discharge reactions are repeated, the capacity is liable to decrease.

In Patent Document 3, a rubeanic acid compound having a dithionic structure is used to perform a two-electron reaction. However, when a high-molecular compound such as a rubeanic acid polymer is used, the intermolecular interaction within the rubeanic acid polymer is large, and the movement of ions is prevented. As a result, obtaining a sufficient reaction speed is difficult, and the ratio of active materials which can be effectively used decreases. Accordingly, obtaining a secondary battery having a desired high capacity is difficult.

In Patent Document 4, a phenanthrenequinone compound having two quinone groups located at ortho position is used as an electrode active material, and thus, the stability is superior. However, because the compound is a condensed ring compound, the synthesis is difficult, and the energy density is not sufficient.

Accordingly, conventionally, as above, although the organic radical compound or an organic compound such as a disulfide compound, a rubeanic acid, etc., is used as an electrode active material, achieving both of the multi-electron reaction and the stability of the charge/discharge cycle is difficult. Therefore, a long-life electrode active material having a sufficiently large energy density, high power, and superior cycle characteristics, has not been obtained yet.

The present disclosure has been created in view of the above. One of the objectives of the present disclosure is to provide an electrode active material having a large energy density, and superior cycle characteristics that energy decrease is small even if the charge/discharge is repeated, as well as an electrode and a secondary battery using the electrode active material.

In order to attain the above objective, the present disclosure includes the following aspects.

[1] An electrode active material used as an active material for a secondary battery which is repeatedly charged and discharged by a battery electrode reaction, and comprising the compound having a dithiadiazine group.
[2] An electrode active material according to [1], wherein the compound having a dithiadiazine group is a compound having a dithiadiazine group and a thioamide group.
[3] An electrode active material according to [1[ or [2], wherein the compound having a dithiadiazine group is a compound represented by the following formula (2):

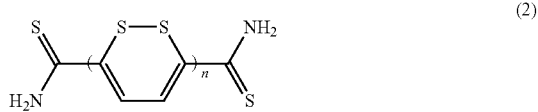 [SMILES: NC(=S)C1=CC=C(C(N)=S)SS1]

(2)

[wherein, n is an integer of 20 or less].
[4] An electrode comprising an electrode active material according to any one of [1] to [3], and a conductive material.
[5] An electrode according to [4], wherein the electrode is impregnated with a liquid electrolyte containing hydrofluoroether.
[6] An electrode according to [5], wherein the content of the hydrofluoroether is 5 to 60% by mass of the liquid electrolyte.
[7] An electrode according to any one of [4] to [6], wherein the content of the compound having a dithiadiazine group is 20 to 95% by mass.
[8] A secondary battery comprising an electrode active material according to any one of [1] to [3], in any one of a reaction starting material, a product, and an intermediate product of at least a discharge reaction of the battery electrode reaction.

According to the present disclosure, an electrode active material having a large energy density, and superior cycle characteristics that energy decrease is small even if the charge/discharge is repeated, as well as an electrode and a secondary battery using the electrode active material, can be provided.

BRIEF DESCRIPTION OF DRAWINGS

FIG. 1 is a cross-sectional view showing a structure of a coin-type battery as a secondary battery according to an aspect of the present disclosure.

ASPECTS OF DISCLOSURE

Hereinbelow, aspects of the present disclosure (hereinbelow, referred to as aspects) will be explained.

An electrode active material according to the present aspect contains a compound having a dithiadiazine group, and is used as an active material of a secondary battery which repeats charging and discharging by a battery electrode reaction. By using the compound having a dithiadiazine group, the charge/discharge reaction is stabilized, and thus, a high-energy electrode active material having superior cycle characteristics can be obtained. As a result, a secondary battery having a large energy density, and an improved stability at the time of charging/discharging, can be obtained.

The content of the compound having a dithiadiazine group in the electrode active material is not particularly limited, but if the content is less than 10% by mass, a sufficient effect may not be obtained, from the viewpoint achieving high capacity. Further, the greater the content of the compound having a dithiadiazine group, the larger the energy density of the electrode. However, for constituting an electrode, a conductive material and a binder are required. When the content of the conductive material is too small, the output of the secondary battery is decreased. Therefore, a preferable content of the compound having a dithiadiazine group is approximately 95% or less.

Here, the dithiadiazine group can be represented by the following General Formula (1).

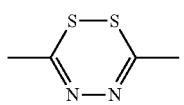
(1)

Further, the compound having a dithiadiazine group can be represented by the following General Formula (2).

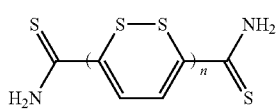
(2)

[wherein, n is an integer of 20 or less.]

The electrode active material according to the present aspect is considered to generate a complex salt along with the battery electrode reaction. The following Chemical Equation (A) shows an example of a charge/discharge reaction anticipated in the case where the organic compound represented by the above General Formula (2) is used as the electrode active material, and the lithium ion is used as a cation of the electrolyte salt.

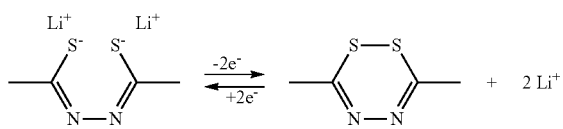
(A)

As shown in Chemical Equation (A), regarding the electrode active material according to the present aspect, two electrons are involved in the reaction at the time of charging/discharging, and the dithione part (C—S—S—C) included in the compound having a dithiadiazine group bonds with $Li^+$ at the time of reduction, and releases $Li^+$ at the time of oxidation. Namely, the compound having a dithiadiazine group can be oxidized/reduced by two or more electrons per dithiadiazine group, and thus, an electrode active material having a superior charging/discharging efficiency and high energy density per mass, can be obtained. Further, the electrode active material according to the present aspect is stable and the decrease in the electron number is small, even after repeating the reactions. Therefore, even if the charging/discharging is repeated, the stability remains (the cycle characteristic being superior). As a result, using the electrode active material according to the present aspect, stability at the time of charging/discharging is improved, and a high energy (high energy density) secondary battery can be achieved.

The polymerization degree n of the dithiadiazine group constituting the electrode active material is not particularly limited. However, if the polymerization degree n is 20 or more, because of the increase in molecular rigidity, the free volume decreases, leading to decreasing the speed of the oxidation/reduction reaction, which is the charge/discharge reaction. Accordingly, preferably, n is in the range of approximately 1 to 20. Further, according to the present aspect, a plurality compounds with n can be mixed and used.

In the present aspect, a synthesis method for the compound having a dithiadiazine group is not limited. For example, the synthesis can be performed by a cyclization reaction of diamino-N-alkyl ethane thioamide and alkyl imino chloromethane sulfenyl chloride, oxidation polymerization of dithiooxamide, and the like.

The active material constituting the electrode of the secondary battery according to the present aspect includes the compound having a dithiadiazine group, which can be confirmed by Raman mapping measurement of the electrode surface. Namely, the positive electrode constituting the secondary battery is removed under a dry atmosphere, when the electrode is in the charged state, the discharged state, or the intermediate state. The removed positive electrode is washed and dried, and thereafter, a region having less conductive material is observed by Raman mapping method and the compound having a dithiadiazine group is identified. When a dithiadiazine group is present, a peak derived from the S—S bond can be found at 530 to 545 $cm^{-1}$, and a peak derived from the N—N bond can be found at 1150 to 1250 $cm^{-1}$. Further, the polymerization degree n can be obtained by measuring the electrode removed in the charged state using the Raman mapping method, and comparing the peak strength derived from the C=S bond and found at 1000 to 1100 $cm^{-1}$, with the above-mentioned peak strengths derived from the S—S bond and the N—N bond.

Next, a secondary battery using the above-mentioned electrode active material is to be described in detail. FIG. 1 is a cross-sectional view of a coin-type secondary battery, which is an aspect of the secondary battery according to the present disclosure. In the example shown in FIG. 1, the above-mentioned electrode active material according to the present aspect is used as a positive-electrode active material.

In FIG. 1, the battery can 1 has a positive electrode case 2 and a negative electrode case 3, and both of the positive electrode case 2 and the negative electrode case 3 formed to have a thin disc shape. At the bottom central region of the positive electrode case 2 constituting the positive electrode current collector, a positive electrode 4 is located, the positive electrode 4 being obtained by forming a mixture containing a positive-electrode active material (electrode active material) and a conductive aid (conductive material) into a sheet shape. Further, a separator 5 formed by a porous sheet or film, such as micro-porous membrane, woven cloth, non-woven cloth, etc., is stacked on the positive electrode 4. Further, a negative electrode 6 is stacked on the separator 5. Examples of the negative electrode 6 include a laminate formed by laminating a metal foil of lithium on a stainless foil or a copper foil, or a copper foil on which a lithium occluding material such as graphite, hard carbon, etc., is coated. A negative electrode current collector 7 made of metal is stacked on the negative electrode 6, and a metal spring 8 is arranged on the negative electrode current collector 7. An electrolyte 9 is filled in the internal space of the battery can 1. Further, the negative electrode case 3 is fixed to the positive electrode case 2, against the energizing force of the metal spring 8, with a gasket 10 therebetween.

Next, an example of a production method of the above-mentioned secondary battery is to be described in detail. First, the electrode active material is formed into a shape of the electrode. For example, the electrode active material is mixed with the conductive aid and a binder, to which a solvent is added to make a slurry. The resulting slurry is coated on the positive electrode current collector (positive electrode case 2) by any desired methods, and dried to form a positive electrode 4. Here, the conductive aid is not particularly limited, and can be, for example, carbonaceous fine particles such as graphite, carbon black, acetylene black, etc., carbon fiber such as vapor grown carbon fiber, carbon nanowire, carbon nanotube, carbon nanohorn, etc., conductive polymer such as polyaniline, polypyrrole, polythiophene, polyacetylene, polyacene, etc. Also, a mixture of two or more kinds of conductive aids can be used. The preferable content of the conductive aid in the positive electrode 4 is 10 to 80% by mass.

The binder is not particularly limited. Various resins such as polyethylene, polyvinylidene fluoride, polyhexafluoropropylene, polytetrafluoroethylene, polyethylene oxide, carboxymethyl cellulose, etc., can be used.

Further, the solvent is not particularly limited. For example, a basic solvent such as dimethyl sulfoxide, dimethylformamide, 1-methyl-2-pyrrolidone, propylene carbonate, diethyl carbonate, dimethyl carbonate, γ-butyrolactone, etc., a nonaqueous solvent such as acetonitrile, tetrahydrofuran, nitrobenzene, acetone, etc., a protic solvent such as methanol, ethanol, water, etc., can be used.

The kind of solvent, and the mixing ratio of the electrode active material and the solvent can be set as desired, taking into account a required feature of the secondary battery, productivity, and the like. The positive electrode 4 can be formed without using the above solvent (without forming a slurry), that is, can be formed by compaction wherein the mixture powder of the electrode active material, the conductive aid, and the binder is pressure molded.

Then, the positive electrode 4 is immersed in a liquid electrolyte used as the electrolyte 9 to infiltrate the electrolyte 9 into the positive electrode 4. Thereafter, the positive electrode 4 is located at the center of the bottom of the positive electrode case 2 which constitutes the positive electrode current collector. Here, when a solid electrolyte is used as the electrolyte 9, a step of mixing the solid electrolyte is performed during the above production procedure of the positive electrode 4. In this case, the separator 5 described below is not used.

Then, the separator 5 impregnated with a liquid electrolyte which is used as the electrolyte 9 is stacked on the positive electrode 4, and further, the negative electrode 6 and the negative electrode current collector 7 are sequentially stacked thereon. Thereafter, in accordance with needs, the electrolyte 9 is injected into the internal space. Then, the metal spring 8 is located on the negative electrode current collector 7, the gasket 10 is arranged on the periphery, and the negative electrode case 3 is fixed to the positive electrode case 2 by a crimping machine, etc., to seal the exterior parts. Thereby, a coin-type secondary battery can be produced.

The electrolyte 9 is located between the positive electrode 4 and the negative electrode 6 which is the counter electrode of the positive electrode 4, and performs charge carrier transport between there electrodes. For the electrolyte 9, the one having an ion conductivity of $10^{-5}$ to $10^{-1}$ S/cm at a room temperature, can be used. The electrolyte 9 may be a liquid electrolyte and a solid electrolyte.

Examples of the liquid electrolyte include an electrolytic solution formed by an electrolyte salt to an organic solvent, an ionic liquid having a combination of anion and cation, and the like. One kind of such a liquid electrolyte can be used solely, or a plurality of types of them can be mixed.

Regarding the electrolytic solution formed by dissolving an electrolyte salt in an organic solvent, examples of the electrolyte salt include $LiPF_6$, $LiClO_4$, $LiBF_4$, $LiCF_3SO_3$, $LiN(CF_3SO_2)_2$, $LiN(C_2F_5SO_2)_2$, $LiC(CF_3SO_2)_3$, $LiC(C_2F_5SO_2)_3$ and the like.

Examples of the organic solvent include ethylene carbonate, propylene carbonate, dimethyl carbonate, diethyl carbonate, methyl ethyl carbonate, γ-butyrolactone, tetrahydrofuran, dioxolane, dimethylformamide, dimethylacetamide, 1-methyl-2-pyrrolidone, glymes such as methyl triglyme, ethyl triglyme, butyl triglyme, methyl tetraglyme, ethyl tetraglyme, butyl tetraglyme, cyclic sulfones such as sulfolane, chain sulfones such as ethyl isopropyl sulfone, 2-(ethylsulfonyl)propane, 2-(ethylsulfonyl)butane, and the like.

Regarding the ionic liquid, examples of the cation include imidazolium such as 2-ethylimidazolium, 3-propylimidazolium, 1-ethyl-3-methylimidazolium, 1-butyl-3-methylimidazolium, 1,3-dimethylimidazolium, ammonium such as diethylmethylammonium, tetrabutylammonium, cyclohexyltrimethylammonium, methyltri-n-octylammonium, triethyl(2-methoxyethoxymethyl)ammonium, benzildimethyl tetradecyl ammonium, benziltrimethyl ammonium, and others such as alkylpyridinium, dialkylpyrrolidinium, tetraalkylphosphonium, trialkylsulfonium, and the like; and examples of the anion include halide anion such as $Cl^-$, $Br^-$, $I^-$, etc., boride anion such as $BF_4^-$, $B(CN)_4^-$, $B(C_2O_4)_2^-$, etc., amide anion or imide anion such as $(CN)_2^-$, $[N(CF_3)_2]^-$, $[N(SO_2CF_3)_2]^-$, etc., sulfate anion or sulfonate anion such as $RSO_3^-$. (R representing an aliphatic hydrocarbon group or an aromatic hydrocarbon group, hereinafter the same), $RSO_4^-$, $R^fSO_3^-$ ($R^f$ representing a fluorine-containing halide hydrocarbon group, hereinafter the same), $R^fSO_4^-$, etc., phosphate anion such as $R^f_2P(O)O^-$, $PF_6^-$, $R^f_3PF_3^-$, etc., antimony anion such as $SbF_6^-$, etc., and others such as lactate, nitrate ion, trifluoroacetate, and the like.

Exampled of the high molecular compound used as the solid electrolyte include a vinylidene fluoride based polymer such as polyvinylidene fluoride, vinylidene fluoride-hexafluoropropylene copolymer, vinylidene fluoride-ethylene copolymer, vinylidene fluoride-monofluoroethylene copolymer, vinylidene fluoride-trifluoroethylene copolymer, vinylidene fluoride-tetrafluoroethylene copolymer, vinylidene fluoride-hexafluoropropylene-tetrafluoroethylene terpolymer, etc., an acrylonitrile based polymer such as acrylonitrile-methyl methacrylate copolymer, acrylonitrile-methyl acrylate copolymer, acrylonitrile-ethyl methacrylate copolymer, acrylonitrile-ethyl acrylate copolymer, acrylonitrile-methacrylic acid copolymer, acrylonitrile-acrylic acid copolymer, acrylonitrile-vinyl acetate copolymer, etc., and further, polyethylene oxide, ethylene oxide propylene oxide copolymer, and an acrylate polymer or a methacrylate polymer thereof, and the like. Further, such a high molecular compound can be impregnated with an electrolytic solution to become a gel, which is used as the electrolyte 9, or only a high molecular compound impregnated with an electrolyte salt as it is can be used as the electrolyte 9.

When a liquid electrolyte is used as the electrolyte 9, dissolving hydrofluoroether in the liquid electrolyte is preferable. In general, the liquid electrolyte hardly infiltrates into the positive electrode 4, the separator 5, etc. However, when the liquid electrolyte contains hydrofluoroether, the liquid electrolyte more easily infiltrates into the positive electrode 4, the separator 5, etc. Preferably, the liquid electrolyte contains 5 to 60% by mass of hydrofluoroether, from the viewpoint that the liquid electrolyte easily infiltrates into the positive electrode 4, the separator 5, etc.

Example of the hydrofluoroether includes 1,1,2,2-tetrafluoroethyl-2,2,2-trifluoroethyl ether, 1,1,1,2,2,3,3,4,4-nonafluoro-4-methoxybutane, and the like.

As mentioned above, the electrode according to the present aspect contains the above-mentioned electrode active material and the conductive aid (conductive material), and thus, can achieve a superior charge/discharge efficiency, short charging time, and high output power.

Further, the electrode active material of the secondary battery is reversibly oxidized or reduced when it is charged or discharged. Therefore, the structure and the status are different among the charged state, the discharged state, and the intermediate state. However, according to the present aspect, the electrode active material is contained at least in any one of a reaction starting material (material which causes a chemical reaction in the battery electrode reaction), a product (material which is obtained as a result of a chemical reaction), and an intermediate product, of the discharging reaction. As a result, a long-life secondary battery capable of having a large energy density, performing rapid charging, discharging at high output power, and having a stable battery characteristics with a superior cycle characteristics that capacity decrease is small even if the charge/discharge is repeated, can be obtained.

Further, because the electrode active material is mainly composed of an organic compound, a safe secondary battery free from heavy metals such as Pb, Mn, etc., with a decreased environmental load, and free from oxygen to suppress abnormal reactions, can be obtained.

Further, the present disclosure is not limited to the above aspect, and can be variously modified without departing from the scope of the present disclosure. For example, regarding the organic compound mainly composing the electrode active material, as far as the compound has a dithiadiazine group, the battery electrode reaction same as the above-mentioned chemical equation (A) progresses, and thus, even if the compound is a compound having a dithiadiazine group in a part of a structure, a certain effect can be obtained.

Further, in the present aspect, a coin-type secondary battery is explained. However, as a matter of course, the shape of the battery is not particularly limited, and the present disclosure can be applied to a cylindrical shape, a square shape, a sheet-type, and the like. Also, the exteriorization method is not particularly limited, and thus, a metal case, resin molding, aluminum laminate film, and the like, can be applied.

Further, according to the present aspect, the electrode active material is used as the positive-electrode active material, but the electrode active material is also useful as the negative-electrode active material.

EXAMPLES

Hereinbelow, specific examples of the present disclosure will be specifically explained. The examples are described below for the purpose of easy understanding of the present disclosure, and the present disclosure is not limited to these examples.

Example 1

[Production of Secondary Battery]

0.05 M of sulfolane solution containing dithiooxamide was provided in a glass container, and lithium bis(trifluoro methanesulfonyl)imide ($LiN(CF_3SO_2)_2$) was added thereto until the solution became 0.25 M, and was stirred. Two platinum electrodes were immersed in this solution, to which a voltage of 4.2 V was applied while the solution was stirred, and continuously reacted for 24 hours. After the reaction was complete, the resulting black solution was filtered, and dried. Thereby, black powder was obtained. The Raman spectroscopy (Raman mapping) and infrared spectroscopy of the obtained compound revealed that the product was 1,2,4,5-dithiadiazine-3,6-dicarbothioamide which can be represented by the Chemical Formula (3).

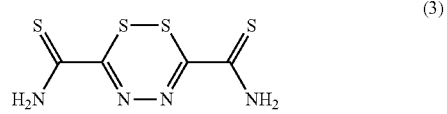

(3)

300 mg of the above 1,2,4,5-dithiadiazine-3,6-dicarbothioamide as a positive-electrode active material, 600 mg of graphite powder as a conductive aid, and 100 mg of polytetrafluoroethylene as a binder, were mixed and kneaded, which was then press-molded to obtain a sheet-like member having a thickness of approximately 150 µm. Next, the sheet-like member was dried for one hour, at 70° C., in a vacuum, and thereafter, punched-out to become a circle having a diameter of 12 mm. Thereby, a positive electrode containing a mixture for an active material was produced. Next, the positive electrode was impregnated with an electrolytic solution, and the electrolytic solution was filled in a void of the positive electrode. Here, a mixture solution containing equimolecular amounts of methyl tetraglyme (organic solvent) and $LiN(CF_3SO_2)_2$ (electrolyte salt) was prepared as the electrolytic solution.

Next, the positive electrode was placed on the positive electrode current collector, and a separator made of a 20-µm-thick polypropylene porous film impregnated with the above electrolytic solution was stacked on the positive electrode. In addition, a 0.2-mm-thick lithium extruded plate which was punched-out to have a diameter of 14 mm was stacked thereon, and a stainless current collector having a diameter of 16 mm was further stacked thereon. Thereafter, a metal spring was placed on the current collector, and a gasket was arranged on the periphery. Under this state, the negative electrode case and the positive electrode case were connected, and the exterior was sealed by a cramping machine. Accordingly, an airtight coin-type secondary battery having a 1,2,4,5-dithiadiazine-3,6-dicarbothioamide as a positive-electrode active material and having metal lithium as a negative-electrode active material, was produced. In this case, the positive electrode and the separator were impregnated with the electrolytic solution, and were wet, and thus, the electrolytic solution was not filled in the internal space of the coin-type secondary battery.

[Operation Check of Secondary Battery]

The coin-type secondary battery produced as above was charged by the charge-discharge test system (TOSCAT3100, manufactured by Toyo System Co., Ltd.) at a constant current of 0.1 mA, until the voltage reached 4.2 V, and thereafter, the battery was discharged at a constant current of 0.1 mA until the voltage became 1.5 V. As a result, this secondary battery was confirmed to have a voltage flat part at a charge/discharge voltage of 2.1 V and have a discharge capacity of 0.36 mAh.

The calculation based on the above discharge capacity revealed that the positive-electrode active material had an energy density per mass of 660 Ah/kg. Thus, the compound used for the above positive-electrode active material was found to be an electrode active material having a high energy density, which is suitable for a high energy density battery.

Thereafter, using the above charge-discharge test system, the charging/discharging was repeated for 100 cycles, within the range of 1.5 to 4.2 V. As a result, the discharge capacity after the 100 cycles was 0.35 mAh (97% of the initial capacity), which revealed that the stability was superior.

Example 2

[Production of Secondary Battery]

Except that an ionic liquid composed of 1-ethyl-3-methyl imidazolium and bis(trifluoro methanesulfonyl)imide (NH(SO$_2$CF$_3$)$_2$) was used as the electrolytic solution, instead of the mixture solution of methyl tetraglyme and LiN(CF$_3$SO$_2$)$_2$, and that an electrolytic solution containing LiN(CF$_3$SO$_2$)$_2$ (electrolyte salt) having a molar concentration of 1 M was used, other conditions were the same those in the method of Example 1, and a coin-type half-cell battery was produced.

[Operation Check of Secondary Battery]

The above coin-type secondary battery was charged by the same charge-discharge test system as in Example 1, at a constant current of 0.1 mA until the voltage reached 4.2 V, and thereafter, the battery was discharged at a constant current of 0.1 mA until the voltage became 1.5 V. As a result, this secondary battery was confirmed to have a voltage flat part at a charge/discharge voltage of 2.1 V and have a discharge capacity of 0.48 mAh.

The calculation based on the above discharge capacity revealed that the positive-electrode active material had an energy density per mass of 640 Ah/kg. Thus, the compound used for the above positive-electrode active material was found to be an electrode active material having a high energy density, which is suitable for a high energy density battery.

Thereafter, using the above charge-discharge test system, the charging/discharging was repeated for 100 cycles, within the range of 1.5 to 4.2 V. As a result, the discharge capacity after the 100 cycles was 0.38 mAh (79% of the initial capacity), which revealed that the stability was superior.

Example 3

[Production of Secondary Battery]

0.01 M ethanol solution containing dithiooxamide was provided in a glass container, and lithium hexafluorophosphate was added thereto until the solution became 0.25 M, and was stirred. Two platinum electrodes were immersed in this solution, to which a voltage of 4.2 V was applied while the solution was stirred, and continuously reacted for 48 hours. After the reaction was complete, the resulting black solution was filtered, and dried. Thereby, black powder was obtained. The Raman spectroscopy (Raman mapping) and infrared spectroscopy of the obtained compound revealed that the product was mainly composed of [3,3'-bis-1,2,4,5-dithiadiazine]-6,6'-dicarbothioamide which can be represented by the Chemical Formula (4).

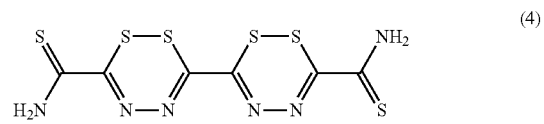

A coin-type battery was produced in the same way as the method of Example 1, except that [3,3'-bis-1,2,4,5-dithiadiazine]-6,6'-dicarbothioamide, instead of 1,2,4,5-dithiadiazine-3,6-dicarbothioamide of Example 1, was used as the positive-electrode active material.

[Operation Check of Secondary Battery]

The above coin-type secondary battery was charged by the same charge-discharge test system as in Example 1, at a constant current of 0.1 mA until the voltage reached 4.2 V, and thereafter, the battery was discharged at a constant current of 0.1 mA until the voltage became 1.5 V. As a result, this secondary battery was confirmed to have a voltage flat part at a charge/discharge voltage of 2.2 V and have a discharge capacity of 0.31 mAh.

The calculation based on the above discharge capacity revealed that the positive-electrode active material had an energy density per mass of 480 Ah/kg. Thus, the compound used for the above positive-electrode active material was found to be an electrode active material having a high energy density, which is suitable for a high energy density battery.

Thereafter, using the above charge-discharge test system, the charging/discharging was repeated for 100 cycles, within the range of 1.5 to 4.2 V. As a result, the discharge capacity after the 100 cycles was 0.25 mAh (80% of the initial capacity), which revealed that the stability was superior.

Example 4

750 mg of the 1,2,4,5-dithiadiazine-3,6-dicarbothioamide of Example 1 as a positive-electrode active material, 150 mg of graphite powder as a conductive aid, 20 mg of vapor grown carbon fiber, 40 mg of 20% polyethylene resin emulsion and 40 mg of carboxymethyl cellulose as a binder, were mixed and kneaded. The resulting slurry was coated on a 15-µm-thick aluminum foil, and dried, and thereby, a coated electrode having a thickness of approximately 70 µm was obtained. The electrode was punched out to become a circle having a diameter of 12 mm, and thereby, a positive electrode containing a mixture for the active material was produced.

Next, the positive electrode was placed on the positive electrode current collector of a coin-type battery, and a separator made of a 20-µm-thick polypropylene porous film was stacked on the positive electrode. The electrolytic solution was dropped thereto, and the reduced-pressure impregnation was performed three times, wherein the pressure was changed from the normal pressure to the pressure reduction rate of 70%. Here, as a electrolytic solution, a mixture solvent (mass ratio 90:10) of sulfolane containing 1 M of lithium bis(trifluoro methanesulfonyl)imide (LiN(CF$_3$SO$_2$)$_2$), and 1,1,2 2-tetrafluoroethyl-2,2,2-trifluoroethyl ether as hydrofluoroether, was used.

Next, a 0.2-mm-thick lithium extruded plate which was punched-out to have a diameter of 14 mm was stacked thereon, and a stainless current collector having a diameter of 16 mm was further stacked thereon. Thereafter, a metal spring was placed on the current collector, and a gasket was arranged on the periphery. Under this state, the negative electrode case and the positive electrode case were connected, and the exterior was sealed by a cramping machine.

Accordingly, an airtight coin-type secondary battery having a 1,2,4,5-dithiadiazine-3,6-dicarbothioamide as a positive-electrode active material and having metal lithium as a negative-electrode active material, was produced.

[Operation Check of Secondary Battery]

The coin-type secondary battery produced as above was charged by the charge-discharge test system as in Example 1, at a constant current of 0.1 mA, until the voltage reached 4.2 V, and thereafter, the battery was discharged at a constant current of 0.1 mA until the voltage became 1.5 V. As a result, this secondary battery was confirmed to have a voltage flat part at a charge/discharge voltage of 2.1 V and have a discharge capacity of 2.4 mAh.

The calculation based on the above discharge capacity revealed that the positive-electrode active material had an energy density per mass of 600 Ah/kg. Thus, the compound used for the above positive-electrode active material was found to be an electrode active material having a high energy density, which is suitable for a high energy density battery.

Thereafter, using the above charge-discharge test system, the charging/discharging was repeated for 100 cycles, within the range of 1.5 to 4.2 V. As a result, the discharge capacity after the 100 cycles was 1.95 mAh (81% of the initial capacity), which revealed that the stability was superior.

Example 5

[Production of Secondary Battery]

Except that a mixture solvent (mass ratio 90:10) of ethyl isopropyl sulfone containing 1 M of lithium bis(trifluoro methanesulfonyl)imide and 1,1,2,2-tetrafluoroethyl-2,2,2-trifluoroethyl ether as hydrofluoroether was used as the electrolytic solution, instead of the mixture solvent (mass ratio 90:10) of sulfolane containing 1 M of lithium bis(trifluoro methanesulfonyl)imide and 1,1,2,2-tetrafluoro-ethyl-2,2,2-trifluoroethyl ether, other conditions were the same those in the method of Example 4, and a coin-type half-cell battery was produced.

[Operation Check of Secondary Battery]

The coin-type secondary battery was charged by the charge-discharge test system as in Example 1, at a constant current of 0.1 mA, until the voltage reached 4.2 V, and thereafter, the battery was discharged at a constant current of 0.1 mA until the voltage became 1.5 V. As a result, this secondary battery was confirmed to have a voltage flat part at a charge/discharge voltage of 2.1 V and have a discharge capacity of 0.45 mAh.

The calculation based on the above discharge capacity revealed that the positive-electrode active material had an energy density per mass of 600 Ah/kg. Thus, the compound used for the above positive-electrode active material was found to be an electrode active material having a high energy density, which is suitable for a high energy density battery.

Thereafter, using the above charge-discharge test system, the charging/discharging was repeated for 100 cycles, within the range of 1.5 to 4.2 V. As a result, the discharge capacity after the 100 cycles was 0.36 mAh (80% of the initial capacity), which revealed that the stability was superior.

EXPLANATION ON NUMERALS

1 battery can, 2 positive electrode case, 3 negative electrode case, 4 positive electrode, 5 separator, 6 negative electrode, 7 negative electrode current collector, 8 metal spring, 9 electrolyte, 10 gasket

The invention claimed is:

1. An electrode active material used as an active material for a secondary battery which is repeatedly charged and discharged by a battery electrode reaction, and
the electrode active material comprises a compound having a dithiadiazine group and a thioamide group, and wherein the diathiazine group is represented by the following Formula (1):

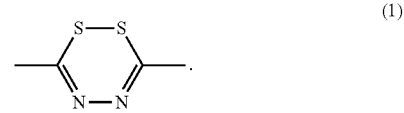

2. An electrode active material according to claim 1, wherein the compound having a dithiadiazine group and a thioamide group;
is represented by the following formula (2):

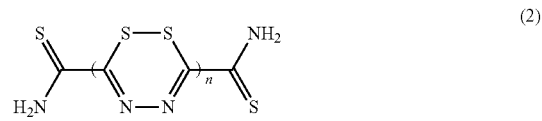

wherein n is an integer of 20 or less.

3. An electrode comprising an electrode active material according to claim 1, and a conductive material.

4. An electrode according to claim 3, wherein the electrode is impregnated with a liquid electrolyte containing hydrofluoroether.

5. An electrode according to claim 4, wherein the content of the hydrofluoroether is 5 to 60% by mass of the liquid electrolyte.

6. An electrode according to claim 3, wherein the content of the compound having a dithiadiazine group is 20 to 95% by mass.

7. A secondary battery comprising an electrode active material according to claim 1, in any one of a reaction starting material, a product, and an intermediate product of at least a discharge reaction of the battery electrode reaction.

* * * * *